United States Patent [11] 3,633,087

[72] Inventors Verne E. Vawter
 Bonita;
 William D. Wilson; Kyle W. Leake, both of
 San Diego, all of Calif.
[21] Appl. No. 19,716
[22] Filed Mar. 16, 1970
[45] Patented Jan. 4, 1972
[73] Assignee Rohr Corporation
 Chula Vista, Calif.

[54] ELECTRONIC TRACER METHOD AND APPARATUS FOR MONITORING THE PATH OF A NUMERICALLY CONTROLLED MACHINE
18 Claims, 2 Drawing Figs.

[52] U.S. Cl. .................................................... 318/565,
 318/574, 318/600
[51] Int. Cl. .................................................... G05b 23/02,
 G05b 19/22
[50] Field of Search .......................................... 318/565,
 600, 39, 574

[56] References Cited
 UNITED STATES PATENTS
2,820,187 1/1958 Parsons et al. ................ 318/565
2,980,838 4/1961 Leete ............................ 318/600
3,418,549 12/1968 Emerson et al. ............... 318/39
3,445,640 5/1969 Harrison et al. ............... 318/600
3,462,662 8/1969 Carpenter ..................... 318/565

Primary Examiner—Benjamin Dobeck
Attorney—George E. Pearson

ABSTRACT: Machine path pulses produced by X, Y and Z slide movements of a numerically controlled machine are compared with pulses derived from the programmed data independently of those which produced the slide movements on command, extra temporary storage being employed to delay the production of the tracer path pulses to compensate for the machine position lag behind the electronic position produced by the command generator. Gated X, Y and Z up-down counters, each counting up on its machine path pulses and down on its tracer path pulses, tend to establish a null condition within up and down count limits to either side of an initially set value. A gating network generates an off null signal when any of the counters exceeds the null limits. Clock signals modulated by the off null signal change the rate of generation of the tracer path pulses to thereby restore the counters to the null condition. When the off null signal persists longer than a predetermined interval, an error signal is produced to stop the machine operation.

INVENTOR.
V. E. VAWTER
W. D. WILSON
K. W. LEAKE
BY George E. Pearson
ATTORNEY 3,633,087

ELECTRONIC TRACER METHOD AND APPARATUS FOR MONITORING THE PATH OF A NUMERICALLY CONTROLLED MACHINE

BACKGROUND OF THE INVENTION

This invention relates generally to methods and apparatus for checking the motion response of a numerically controlled machine and more particularly to an electronic tracer for continuously monitoring the path traversed by the machine in response to its programmed input data and comparing the traversed path with the programmed path to detect any deviations therefrom due to machine or control malfunctions.

The tape input information to a numerically controlled machine typically defines a three-dimensional, X, Y and Z, path of the tool with respect to the work and the velocity of such relative tool/work traverse along the path. This dimensional information consists of straight line segments which are limited in length to conform to the desired contour of the path within an allowable error band. The ideal check on such a machine is to have some means for continuously monitoring the actual path traversed by the machine tool and comparing this machine path with the known desired path. Various such checks have heretofore been known or used with some degree of success. One obvious method is to mount a tracer head on the machine to trace a known good part or template as the machined part is being cut, thereby to provide a measure of any deviation of the machined part from such good part or template reference. However, mechanical problems arise in the use of such a check.

SUMMARY OF THE INVENTION

In accordance with the electronic tracer of the present invention, the machined path is checked electronically without the need for mechanical devices such as the aforementioned templates and tracer heads, thereby obviating their associated mechanical and setup problems. This is accomplished by processing the programmed input data independently of the processing which produces the machine movements and resultant machine path, and generating from this independently processed data, a series of pulses which provide a tape input data defined path. This data defined path is then compared to the actual machine path as measured by machine position sensors.

The data-defined path corresponds to the position generated by the command generator of the numerical control, this position being represented by the generated pulses which direct the X, Y and Z movements of the machine slides. The machine position, however, lags behind the electronic position of the command generator by a distance proportional to the velocity along the machine path. Two redundant time coincident controls could not be used to check the actual machine path because of the time timelag of the machine path with respect to its electronically generated command path.

This timelag problems is solved in the electronic tracer system of the instant invention by using additional temporary storage in the tracer control path, and by setting the machine and tracer paths electronically to the same starting point at the start of the machine operation. This starting point corresponds to the initial setting of gated X, Y and Z up-down counters which are moved up on pulses received from their respective X, Y and Z sensors, and are moved down on pulses received from their respective X, Y and Z outputs of the tracer path generator. Predetermined up and down counts away from the initial set value of each of the X, Y and Z counters constitutes its null range, and any deviation outside this null by any of the counters causes a gating network to produce an off null signal. The off null signal modulates a clock signal rate control of the tracer path generator so that the tracer generates enough of the tracer path to restore the counters to the null condition. If due to some malfunction, the machine does not follow the correct path, the tracer path is unable to restore the null condition, and the persisting off null signal constitutes an error signal which is utilized to stop the machine.

The machine, however, because of its finite time constant, is required to deviate from the defined path such, for example, at corners or upon a reversal of an axis. These are only transient deviations which permit the machine to return to the defined path within a few hundred milliseconds. These transient path deviations are detected and timed, but are not treated as errors unless they persist longer than the time set by a timer, which time is of the order of about four machine axis time constants.

Other objects, features and advantages of the present invention will become more clearly apparent from the following detailed description taken in reference to the accompanying drawings.

BRIEF DESCRIPTION OF THE DRAWINGS

In the accompanying drawings.

Figure 1:
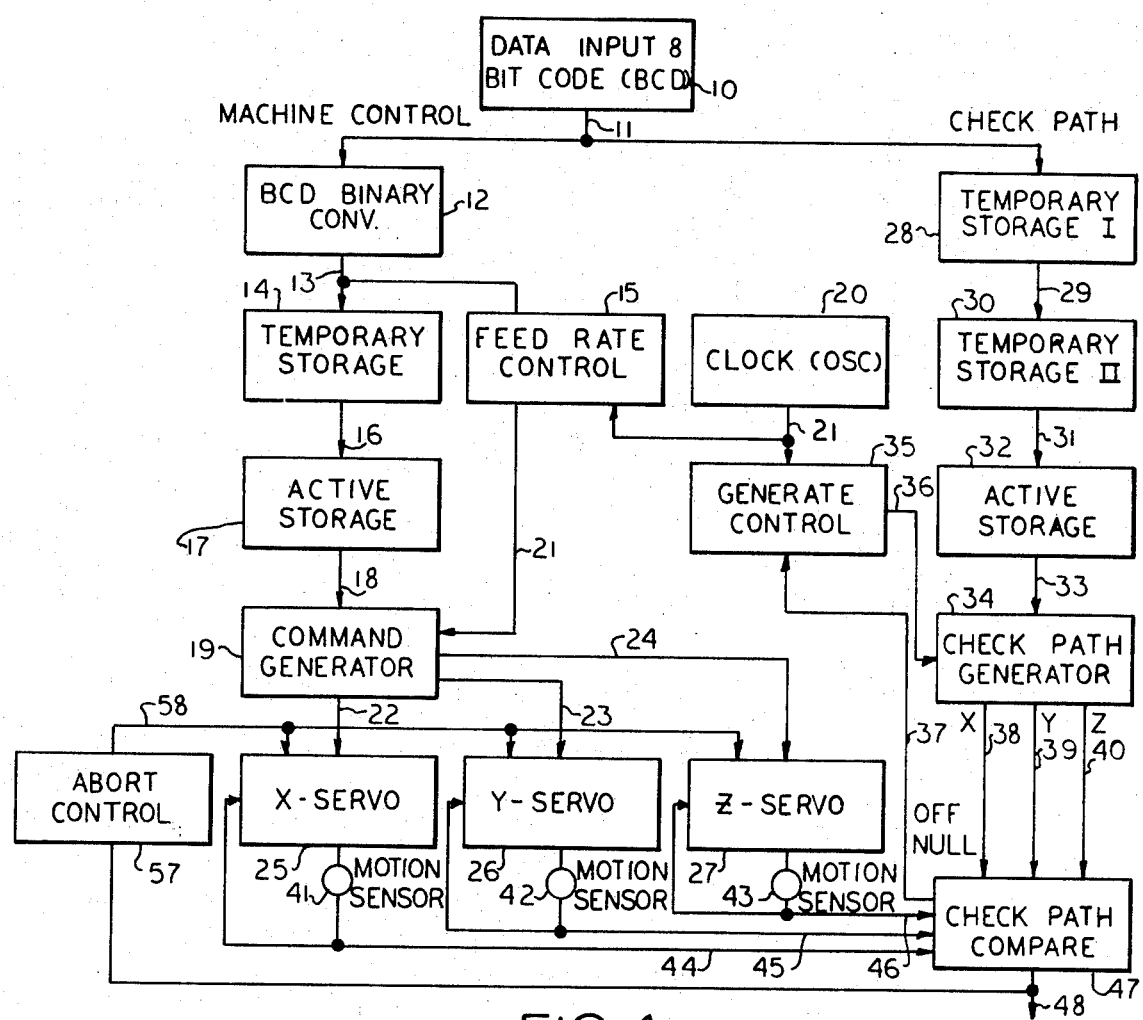
FIG. 1 is a diagrammatic view in block diagram form of the electronic tracer system of the present invention.

Referring now to the drawings and first more particularly to FIG. 1 thereof, the block 10 represents a tape reader which reads a programmed tape input and, on output line 11, provides an output which consists of blocks of 8 bit characters which contain direction and rate information and distance, expressed as the number of least increments, for each of the X, Y and Z machine tool axes. The distances and rate are expressed as binary coded decimal numbers.

The binary coded decimal information on line 11 is supplied as the input to both the numerical control path (left-hand side of FIG. 1) designated the "MACHINE CONTROL" and to the electronic tracer path (right-hand side of FIG. 1) designated the "CHECK PATH." The machine control is typical of conventional numerical control systems such, for example, as that disclosed in FIG. 3 of U.S. Pat. No. 3,418,549 of H. C. Emerson et al., which patent is assigned to the assignee of the instant invention.

In the machine control path, the binary coded decimal numbers received thereby via line 11 are first converted to pure binary numbers in the "BCD BINARY CONVERTOR" block 12 and then supplied via line 13 to "TEMPORARY STORAGE" block 14 and also to the "FEED RATE CONTROL" block 15. Blocks of binary numbers in temporary storage 14 are transferred via line 16 to "ACTIVE STORAGE" block 17 any time active storage is ready to receive a new block of information.

Numbers in active storage 17 are supplied via line 18 to the "COMMAND GENERATOR" block 19 to produce a number of command pulses for each of the X, Y and Z axes equal to the number in active storage, these command pulses being equally spaced in time and at the programmed rate to give the desired machine velocity. The rate is controlled by feed rate control 15 which utilizes the binary information supplied via line 13 to modulate the clock signal frequency received from "CLOCK (OSC.)" block 20 by way of line 21, the resulting rate control signal input being supplied via line 21 to command generator 19.

The command generator pulses corresponding the X, Y and Z axis input data are supplied via lines 22, 23 and 24 to their respective "X-SERVO," "Y-SERVO," and "Z-SERVO" blocks 25, 26, and 27 to cause their associated machine slides to move one least increment for each command pulse received. When the proper number of command pulses has been produced for a given block, the block of binary numbers in active storage 17 is replaced by the block in temporary storage 14, and the next block of binary code decimal information is requested from data input 10 which then, following conversion to binary in converter 12, is put in temporary storage 14, all in a conventional manner well known in the art.

The check path is generally similar to the machine control path and comprises "TEMPORARY STORAGE I" block 28, "TEMPORARY STORAGE II" block 30, "ACTIVE STORAGE" block 32, "CHECK PATH GENERATOR" block 34, "GENERATE CONTROL" block 35, and clock 20. The check path processes the input data similarly to the machine control path but receives the binary coded decimal information on line 11 directly into temporary storage 1 from whence it is transferred via line 29 to temporary storage II before being transferred via line 31 to active storage 32, the action in transferring from temporary storage to active storage and thence via line 33 to check path generator 34 otherwise being the same as in the machine control path.

The check path generator 34 operates basically in the same manner as command generator 19 in that it produces on its X, Y and Z output lines 38, 39 and 40 the same number of pulses from its active storage 32 as the command generator produces on its X, Y and Z output lines 22, 23 and 24. The check path generator, however, produces these pulses only when directed by the generate control 35 in response to a control signal supplied therefrom via line 36. When the correct number of pulses has been generated by check path generator 34, the block in active storage 32 is replaced by the block in temporary storage II.

An off null signal received by generate control 35 via line 37, as hereinafter more fully described causes generate control 35 to feed clock pulses via line 36 to the check path generator, thus providing the aforementioned control signal for controlling the generation of the tracer path pulses.

The data defined path represented by the pulses produced on the output lines 22 to 24 of the command generator 19 is the same as the data defined path represented by the pulses produced on output lines 38 to 40 of the check path generator 34. These paths, however, are displaced by reason of the extra temporary storage in the check path as provided by the temporary storage II block 30, this extra storage being added for a purpose presently to appear.

For purposes of the present invention it is not desired to compare the electronic outputs of the command generator 19 and check path generator 34 as redundant time coincident controls, but to compare the tracer path of the check path generator with the actual machine path produced in response to the command pulses generated by command generator 19. To this end, motion sensors 41 to 43 associated respectively with the X, Y and Z servos 25 to 27 are employed to reconstruct the machine path electronically so that the same may be compared with the tracer path.

Machine motion sensors 41 to 43 each produce one pulse for each least increment of their respective X, Y and Z machine slides, this least increment, for example, being 0.001 inch, and thus, the sensor pulses define an actual machine path. The motion sensors are optical/electrical devices which generate signals corresponding to the moved positions of the slides, as aforementioned. In a typical device, lines on a metal tape corresponding to thousandths of an inch cause a photocell connected pulse generator to generate the number of pulses corresponding to the number of lines crossed. When the number of lines crossed corresponds to the number of pulses generated by command generator 19, the appropriate servomotors are halted for the particular linear instructions.

Because of the inherent properties of servos 25 to 27, the actual machine path produced by the machine slides in response to the command pulses from command generator 19, as represented by the sensor pulses, is behind the data defined path produced by the command generator as represented by the command pulses, the machine path being behind the command generator path by a distance proportional to the machine velocity. This lag, in the absence of the aforementioned temporary storage II (block 30) in the check path, would have caused the processing of an active storage information block by the machine path generator 19 to be completed before the processing of the same block by the check path generator 34, and this is the reason for the additional temporary storage provided in the check path. With the additional storage provided, as shown, when the machine control requests a new block to fill its temporary storage 14, there will be a place to put this same data for the check path, namely, in temporary storage I, block 28. Thus, at the same time the motion sensors 41 to 43 are reconstructing the machine path electronically, the check path generator 34, as represented by its tracer pulses on output lines 38 to 40, will be generating the electronic tracer path. The tracer path may thus be generated coincidentally with the electronically reconstructed machine path so that the two paths may be set electronically at the same starting point at the start of the machine operation and thereafter be compared to detect any deviations therebetween as the cutting proceeds.

The comparison is made by the "CHECK PATH COMPARE" block 47 which receives the X, Y and Z tracer pulses supplied via lines 38 to 40, and also receives the X, Y and Z machine path pulses supplied via lines 44 to 46. Compare block 47, in a manner presently to be described, measures the difference between the actual machine path as represented by the X, Y and Z sensor pulses and the tracer path represented by the X, Y and Z pulses produced by check path generator 34. The aforementioned off null signal on line 37 provides a measure of this difference and is produced by compare block 47 whenever the actual machine path gets ahead of the tracer path by a predetermined number of pulses, which may be small in number. The off null signal causes check path generator 34 to generate pulses until the compare block 47 is restored to a null condition.

Figure 2:
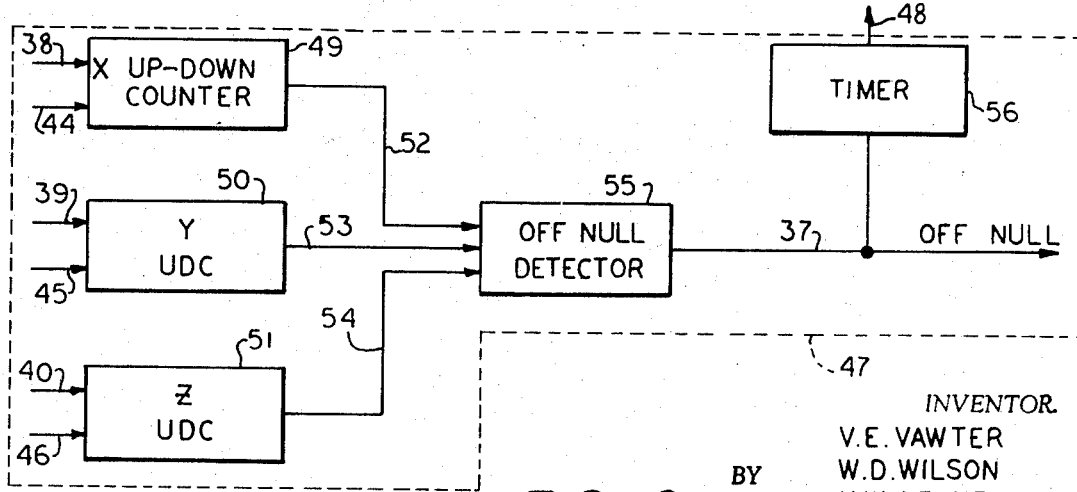
FIG. 2 is a detailed block diagram of the check path compare block of FIG. 1.

Reference is now directed to FIG. 2 from which it may be seen that the check path compare block 47 comprises "X UP-DOWN COUNTER" block 49, "Y UP-DOWN COUNTER" block 50, and "Z UP-DOWN COUNTER" block 51 which respectively receive the X, Y and Z tracer path pulses on the aforementioned lines 38 to 40, and respectively receive the X, Y and Z machine path pulses on the aforementioned lines 44 to 46. These X, Y and Z counters are of a conventionally known and used type which are so constructed and arranged that the machine path X, Y and Z pulses count their respective X, Y and Z counters up for one direction of motion of their respective machine slides and down for the other direction, and similarly, the X, Y and Z tracer path pulses count their respective X, Y and Z counters up or down depending on the sign of the number in active storage 32 of the check path. It will be understood that the machine path and tracer pulses are effectively applied in opposition to their common counters whereby the same tend to remain on an initially set number. Thus, if the generated tracer path is the same as the actual machine path, the up-down counters will receive as many up pulses as down pulses, and the counters will remain on the same number. For the sake of simplicity, heretofore early in the description and in the appended claims, the counters are said to count up on machine path pulses and down on tracer path pulses to thus tend to restore the null condition or setting of the counters. Actually, as aforenoted, depending on the direction of the slide movements, the machine path will constitute down pulses as well as up pulses and, depending on the sign of the numbers in active storage 32, the tracer path will constitute up pulses as well as down pulses.

Initially each of the X, Y and Z counters is preset to a given number, and a null band is defined as a set of numbers on either side of and including the preset number. This null band is the allowable machine path deviation before an off null signal is produced on the aforesaid line 37 by the "OFF NULL DETECTOR" block 55. Off null detector 55 is a gating network which receives via lines 52, 53 and 54 the outputs of X, Y and Z counters 49 to 51, and which produces the off null signal when any of the counters contains a number which is not in the null band. The null signal causes the generate control 35 to feed clock pulses to the check path generator 34 which, in turn, causes the tracer path pulses to be fed to the up- down counters to return them to the null band.

The off null signal also starts a "TIMER" block 56 which is any suitable timer capable of generating an error signal online 48 therefrom when the off null signal persists longer than the timer interval. As heretofore stated, the timer may be set to provide a time interval of the order of about four machine axis time constants to allow for transient path deviations.

The error signal on line 48 may be used to set off an alarm or to actuate the "ABORT CONTROL" block 57, FIG. 1, which in turn, may supply an abort signal via line 58 to disable the X, Y and Z servos 25 to 27 to thus stop the machine. The value of the protection afforded by such an abort action is apparent from the realization that cutting errors may be sufficiently severe to cause scrapping of costly forgings.

From the foregoing, it will not be apparent that an electronic tracer method and apparatus has been provided which is well adapted to fulfill the aforestated objects and purposes of the invention.

Accordingly, what is claimed and desired to be secured by Letters Patent of the United States is:

1. An electronic tracer method of monitoring the response of a numerically controlled machine to programmed data which comprises the steps of generating from the programmed data a first series of data pulses for producing incremental machine movements therefrom, directing the machine movements in response to said data pulses, sensing said machine movements and generating a series of position pulses indicative thereof, generating from the programmed data a second series of data pulses corresponding to said first series of data pulses and coincident with said position pulses at the start of the machine operation, comparing said position pulses with said second series of data pulses to measure any difference therebetween, and stopping operation of the machine when said difference therebetween, and stopping operation of the machine when said difference exceeds a predetermined value.

2. The electronic tracer method as in claim 1 and including the further step of generating an off null signal whenever the position pulses are generated at a different rate than said second series of data pulses by a predetermined number of pulses, and responsive to said off null signal changing the rate of generation of said second series of data pulses until a null is established thereby with respect to said position pulses.

3. The electronic tracer method as in claim 2 and including the further step of producing an error signal when the off null signal when the off null signal persists for a period of time longer than a predetermined interval.

4. The electronic tracer method as in claim 3 and including the further step of stopping the machine operation in response to the error signal.

5. The method as in claim 1 and including the step of generating the second series of data pulses in predetermined time delayed relation to the generation of the first series of data pulses.

6. The method as in claim 5 and including the step of setting the time delay in proportion to the machine velocity.

7. An electronic tracer method of monitoring the response of a numerically controlled machine which comprises the steps of producing machine movements along a path in response to programmed data, generating an electronic tracer path from said programmed data, setting said machine and tracer paths electronically at the same starting point at the start of the machine operation, comparing the tracer path with the machine path to measure any difference therebetween, changing the rate of generation of the tracer path in accordance with any said measured difference to reduce the same to within predetermined limits, and stopping the machine operation when said difference exceeds said limits.

8. Electronic trace apparatus for monitoring the machine path of a numerically controlled machine comprising, in combination, means operative from programmed data for producing machine movements along a path, means responsive to said machine movements for producing a series of pulses indicative incrementally of machine positions along the machine path, means operative from said programmed data for generating initially concurrently with said machine position pulses a series of pulses which constitute an electronic tracer path, means normally in a null condition for comparing said machine and tracer path pulses to produce an off null signal when the tracer path pulses are being produced at a different rate by a predetermined number of pulses than said machine path pulses, means responsive to said off null signal for changing the rate of generation of said tracer path pulses to restore said comparing means to its null condition, and means responsive to said off null signal and effective when the same has persisted for a period of time in excess of a predetermined interval for producing an error signal.

9. Electronic tracer apparatus as in claim 8 and additionally comprising means responsive to said error signal for stopping said machine movements.

10. Electronic tracer apparatus as in claim 8, aid tracer path generating means including means for setting said machine and tracer paths electronically at the same starting point at the time of the start of the machine operation whereby the machine and tracer pulses are initially coincident and said comparing means is in said null condition thereof.

11. Electronic tracer apparatus as in claim 10, said means for generating said machine path comprising temporary storage for receiving said programmed data, and said means for setting the machine and tracer paths at the same starting point comprises temporary storage in excess of said temporary storage of the machine path.

12. Electronic tracer apparatus as in claim 11, said machine path producing means comprising active storage for receiving said programmed data from temporary storage and a command generator operative on position information received from active storage for generating a series of position pulses for producing said machine movements, said machine path producing means comprising clock controlled means modulated by rate information derive from said programmed data for controlling the rate of said position pulses.

13. Electronic tracer apparatus as in claim 8, said means for increasing the rate of generation of said tracer path pulses comprising clock controlled means modulated by said off null signal.

14. Electronic tracer apparatus as in claim 8, said means for comparing said machine and tracer path pulses comprising up-down pulse counter means which counts upwardly in response to the machine pulses and counts downwardly in response to the tracer path pulses, and gate means responsive to said up-down counter means for producing said off null signal when the counter means is set to a number of outside a null band of numbers which includes a predetermined number to which the counter is initially set and a predetermined number of up and down numbers on either side respectively of the set number.

15. Electronic tracer apparatus as in claim 14 and wherein said machine movements comprise X, Y and Z slide movements of the machine, said position pulses are generated for each of said slides and comprise X, Y and Z position pulses, said tracer path pulses constitute X, Y and Z pulses corresponding respectively to the X, Y and Z position pulses, and said counter means comprises X, Y and Z up-down counters for respectively receiving the X, Y and Z machine and tracer path pulses.

16. An electric tracer system of monitoring the response of a numerically controlled machine to programmed data which comprises the combination of means for generating from the programmed data a first series of data pulses for producing incremental machine movements therefrom, means for directing the machine movements in response to said data pulses, means for sensing said machine movements and generating a series of position pulses indicative thereof, means for generating from the programmed data a second series of data pulses corresponding to said first series of data pulses and coincident with said position pulses at the start of the machine operation, means for comparing said position pulses with said second series of data pulses to measure any difference therebetween, and means for stopping operation of the machine when said difference exceeds a predetermined value.

17. An electronic tracer system of monitoring the response of a numerically controlled machine which comprises the combination of means for producing machine movements along a path in response to programmed data, means for generating an electronic tracer path from said programmed data, means for setting said machine and tracer paths electronically at the same starting point at the start of the machine operation, means for comparing the tracer path with the machine path to measure any difference therebetween, means for changing the rate of generation of the tracer path in accordance with any said measured difference to reduce the same to within predetermined limits, and means for stopping the machine operation when said difference exceeds said limits.

18. Electronic tracer apparatus as in claim 14 and wherein said machine movements comprise at least one slide movement, said position pulses are generated for said slide, said tracer path pulses correspond to said slide position pulses, and said counter means comprises an up-down counter for receiving the slide position pulses and tracer path pulses.

* * * * *